Sept. 20, 1966 P. B. BELTZ 3,274,375
THERMOSTATIC OVEN CONTROLLER WITH AUTOMATIC RESET
Filed April 16, 1964

INVENTOR.
PHILIP B. BELTZ
BY Charles A. Weigel Jr.
ATTORNEY

__United States Patent Office__ 3,274,375
Patented Sept. 20, 1966

3,274,375
THERMOSTATIC OVEN CONTROLLER WITH AUTOMATIC RESET
Philip B. Beltz, Wilmington, Del., assignor, by mesne assignments, to Hewlett-Packard Company, Palo Alto, Calif., a corporation of California
Filed Apr. 16, 1964, Ser. No. 360,205
6 Claims. (Cl. 219—501)

This invention relates to a process controller and more particularly to an improved means of matching the response of a controller to different control elements or operating conditions. A particular advantage of this invention lies in its simplicity and economy of construction.

In the field of automatic control, it is often necessary or desirable to control a process in accordance with a particular program to have a desired performance. By "process" is meant any physical entity which exhibits a continuous change in time; it may be the flight of a guided missile, the output of a cracking tower, or the temperature of a furnace. In these examples, the result of automatic control of the actual performance of the process may be the missile following a particular path in space, the cracking tower producing a desired grade of gasoline, the temperature of a material in the furnace following a desired cycle.

One mode of control is known as proportional control. In this proportional mode, the controller action is such that a continuous linear relationship exists between the value of the error signal (the difference between the actual and desired process characteristics) and the degree of control action employed to reduce the error signal to zero. Practically, there is a limit to the magnitude of control action possible to correct deviations of the actual characteristics from that desired. Hence a value of error signal magnitude must be chosen at which the full control action of the controller is invoked. Actually, an adjustment is provided to vary this relationship. This adjustment is referred to as the proportioning band adjustment.

A particular problem is incurred in processes where the controller must operate over a wide range of the process variable as, for example in controlling the temperature of an oven. If, for example, an oven is to be employed both for isothermal and programmed temperature operation, a heating element having relatively large heat capacity is required to accommodate the programmed temperature operation. Under isothermal operation the capacity of the heating element for effecting changes in the oven temperature is so great that poor temperature control and "cycling" often results. One possible solution is to widen the proportioning band such that larger error signals are required to apply the same amount of power to the heating element. This has the inherent disadvantage of decreasing the ability of the oven to maintain a precise temperature.

Both the cycling and decreased ability to control temperature of the proportional mode of operation can be alleviated by using a proportional-plus-reset mode of control. In this mode of operation the response of the final control element (heater of an oven) to an error signal is varied with time so as to effectively shift the proportioning band of the controller in such direction as to return the actual process characteristic to its desired value.

A problem incurred in proportional-plus-reset controllers is that the reset function often may be added to the controller only by the use of relatively expensive, sometimes complex, electronic or mechanical circuitry. It is particularly desirable that the reset function exhibit a memory characteristic so as to accommodate variations in the process performance under extreme loading conditions. The memory function should not interfere unduly with the normal controller action, and should permit the decay of the reset function at a rate exceeding its build-up rate.

It is, therefore, an object of this invention to provide an improved controller having a novel automatic reset mode of operation.

Another object of this invention is to provide an improved process controller capable of operating with control elements having different control capabilities and with different process loads.

A conventional proportional controller includes a function generator for providing a signal having an amplitude-time characteristic corresponding to the desired performance of the process to be controlled and a sensing element for providing a signal corresponding to the actual performance of the process to be controlled. The two signals are compared and an electrical error signal generated having at least an amplitude that corresponds to the difference between the actual and desired performance of the process. A control element provides an electrical control signal whose electrical power content varies in accordance with the amplitude of the error signal. A transducer is actuated by the control signal in such a manner as to reduce the error signal to zero.

In accordance with the invention the reset mode of operation is added to the controller by the use of a resistance element having a high negative temperature coefficient of resistivity for varying the amplitude of the error signal as a function of its temperature. A heating element positioned proximate to the resistance element is energized by the control signal to vary the temperature of the resistance element in accordance with the amplitude and time duration of the error signal.

In one embodiment of the invention, the reset rate function is made directionally sensitive by positioning the heating element adjacent only one side of the resistive element. In this manner the heating and cooling rates differ and the reset rate is directionally sensitive.

The novel features that are considered characteristic of this invention are set forth with particularity in the appended claims. The invention, itself, however, both as to its organization and method of operation, as well as additional objects and advantages thereof, will best be understood from the following description when read in connection with the accompanying drawings, in which:

Figure 1:
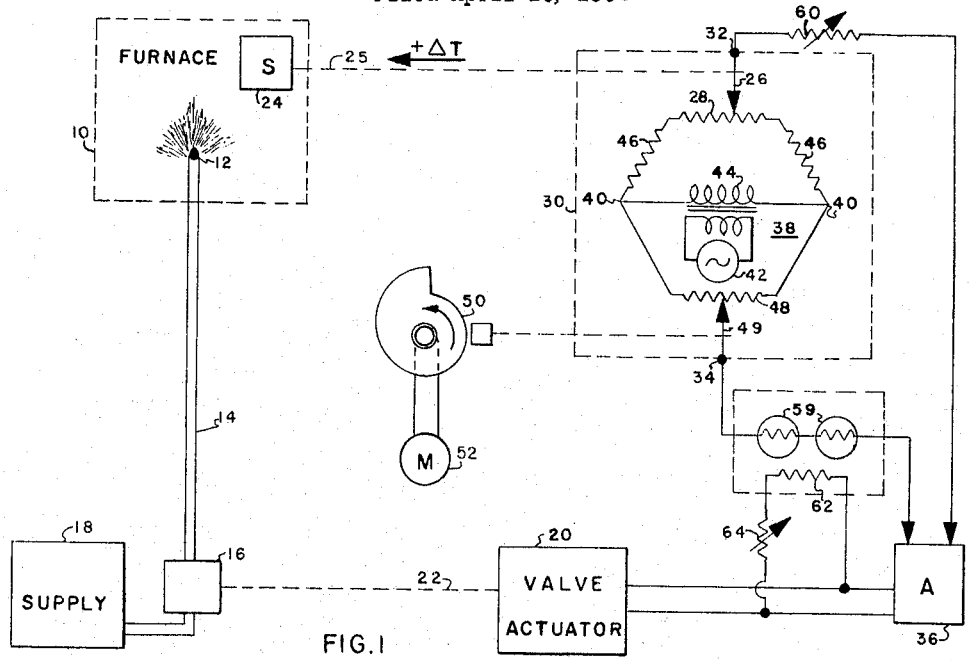
FIGURE 1 is a partial block and partial schematic illustration of a typical controller incorporating this invention.

In the illustration of FIG. 1, the actual performance of the process to be controlled may be the temperature of a furnace 10. The furnace 10 is depicted as including a nozzle 12 for burning fuel supplied from a fuel source 18 through a fuel supply line 14 and a control valve 16. The control valve 16 is mechanically coupled by a suitable linkage 22 to be adjusted by a servo proportioning motor denoted as a valve actuator 20. The motor 20 may be of a conventional type having forward and reverse windings (not shown) which are selectively energized by a suitable servo amplifier 36.

A suitable means for determining the process performance, illustrated as a temperature sensor 24, is positioned inside the furnace 10. The sensor 24 may be a conventional liquid or mercury filled thermal system. Motion derived from the thermal system is transmitted through a sensor linkage 25, to drive the wiper 26 of a low torque potentiometer 28 in a process controller 30. The sensor linkage 25 typically may include a precision jeweled bearing movement assembly. The process controller 30 functions in a conventional manner to measure the difference between the desired programmed performance (temperature) and the actual performance of the process to be controlled. The process controller 30 has a first output terminal 32 and a second output terminal 34. An error signal appears across these output terminals 32, 34 having an amplitude and phase indicative of the difference between the programmed and actual temperatures of the furnace 10. These output terminals 32 and 34 are connected to the input of an amplifier 36 which amplifies the error signal to provide a suitable control signal for the motor 20.

In a typical case the amplifier 36 may be a conventional alternating current amplifier which will drive a servomotor in the proper direction to return the temperature in the furnace 10 to its programmed value. The rate of the control action is dependent upon the amplitude of the error signal applied to the amplifier. The control action is such that the controller 30 changes the heat supplied by the flame at the nozzle by varying the fuel supplied to the nozzle until the actual process performance (temperature) is equal to the desired performance.

As thus far described the controller system is conventional. Suitable servo amplifiers or servomotors may be used as desired. Typical components of this type are described in the book, "Control Engineer's Handbook" by Truxall, published by McGraw-Hill Book Company, 1958. In these conventional prior art systems the process controller 30 usually includes an A.C. bridge circuit 38 illustrated in FIG. 1. The bridge circuit 38 has a pair of input terminals 40 to which a source 42 of alternating current A.C. voltage is supplied through a transformer 44. The bridge circuit 38 also includes a pair of output terminals which correspond to the output terminals 32 and 34, respectively, of the process controller 30. One side of the bridge circuit 38 usually is an electrical voltage divider element, illustrated here as a potentiometer, or slide wire 28, having a variable tap, or wiper 26. The slide wire 28 may be connected in series with impedance elements such as resistors 46 between the input terminals 40. The wiper 26 is either driven directly, as illustrated, by the sensor through the linkage 25, or, if the potentiometer 28 is the retransmitting slide wire of an industrial type potentiometric recorder, is driven by the recorder repositioning motor (not shown) to a position corresponding to the variable being measured (in this instance the temperature of the furnace 10). The position of the tap of the wiper 26 determines the value of the first two series arms of the bridge 38 that are connected between the input terminals 40.

The bridge 38 is completed by connecting a second potentiometer 48 in parallel with the first slide wire 28 across the input terminals 40. The wiper 49 of the second potentiometer 48 is positioned by a cut cam programmer 50 which varies the wiper position as a function of time. The programmer is driven by a motor 52. Since the operation of the programmer thus far described is conventional, it is believed that no further explanation of its operation need be made. The proportioning band of the controller may be adjusted by the inclusion of an adjustable resistor 60 between the output terminal 32 and the other input of the amplifier 36.

In accordance with this invention the reset mode may be added to the controller's action by varying the controller's error signal amplitude by an element having a negative temperature coefficient of resistivity, such as a pair of thermistors 59. The thermistors 59 are connected in series between one output terminal 34 and the amplifier 36. A heater element is connected across the output of the amplifier 36. An adjustable resistor 64 is connected in series with the heater element 62 to provide a means of adjusting the reset rate by limiting the current supplied to the heater element 62.

In operation, if the heating load, say, increases causing a decrease in furnace temperature, the controller 30 detects the deviation and generates an error signal. Only a fraction of this error signal is actually applied across the amplifier 36 input terminals due to the voltage dividing action of the relatively high resistance of the unheated thermistors 59 and the band resistor 60. This error signal is amplified by the amplifier 36 to provide a control signal according to the power content of the control signal, the servomotor 20 positions the valve 16 to a greater or lesser extent. In this instance, the valve 16 opens more and the rate of fuel flow to the burners 12 increases.

If the increased heat produced by this control action is not sufficient to return immediately the furnace temperature to its desired value, the heater 62 gradually heats at a rate determined by the setting of rate resistor 64 and the power content of the control signal. As the temperature of the thermistors 59 increases, their resistance decreases and the amplitude of the error signal applied to the amplifier 36 increases until the actual furnace temperature returns to its desired value.

Once correction is achieved and the actual and desired process performance are substantially equal, the error signal again drops substantially to zero and the heater cools such that the resistance of the thermistors 59 again increases to a relatively high value.

Further in accordance with the invention the heater 62 is placed adjacent only one side of each thermistor. The rate at which the thermistors 59 may be heated is thereby limited. However, since they are exposed on all sides for cooling purposes, their cooling rate greatly exceeds their heating rate. This reduces the controller response time to a decreasing error signal amplitude and facilitates the controller's return to its initial operating condition once the desired furnace temperature is reached. The invention, therefore, provides a relatively simple, economic, differential type of reset action. Although the invention has been described in connection with a particular process controller and a particular heat control, it should be recognized that it has general application to most controllers wherein a proportional-plus-reset mode of operation is desired In FIG. 2 the invention is applied to a power proportioning type of temperature controller using silicon controlled rectifiers 132 and 133 for providing the control signal. In this instance it is the temperature of an oven 100 that is to be controlled. The oven 100 is heated by a heating element 102 which receives electrical power from an alternating current (A.C.) source 100. The A.C. source 100 supplies the heating element 102 through the rectifiers 132, 133. The actual oven temperature is measured by a thermocouple 104. The output E.M.F. from the thermocouple 104 is compared with a desired function signal derived by varying the position of a wiper 110 as a predetermined function of time on a potentiometer 108. The potentiometer 108 is connected across a suitable source of potential illustrated as battery 106. The potentiometer wiper 110 is positioned by a suitable means such as a clock motor 112 or alternately may be driven by a cam such as illustrated in FIG. 1. The difference between the desired and actual signals represent the error signal. The error signal is amplified by a suitable D.C. amplifier.

In this instance the D.C. amplifier is illustrated as comprising a moving vane instrument 114 whose deflection winding 116 receives the error signal. An adjustable resistor 118 is connected across the deflection winding 116 to vary its sensitivity. The vane 114 is adapted to vary the amount of light from a light source 120 to a light responsive resistor 122. The light responsive resistor 122, which may be a conventional photo resistive cell, placed in the firing circuit of the rectifiers 132, 133 so as to vary their firing time as a function of the error signal amplitude, i.e., when the error signal indicates the oven is below its desired temperature, the rectifiers are made to fire earlier in each half signal of the alternating current from the source 100 so as to apply a greater amount of power to the oven heater 102. The converse is also true. In this manner, the power content of the control signal applied to the heater 102 is varied.

The firing circuit is of a conventional type such as that described in the General Electric "Controlled Rectifier Manual" No. CG–442A, published December 1960. Although a thermocouple transducer has been described the circuit shown in FIG. 2 can be used with any transducer which can provide a D.C. signal whose amplitude varies as a function of the characteristic being controlled, for example, temperature, pressure, displacement, strain, acceleration, light or energy travel.

The firing circuit includes a uni-junction transistor 70 having a pair of base electrodes 72, 74 and an emitter electrode 76. One of the base electrodes 74 is coupled to the primary winding 78 of a pulse transformer 80. The pulse transformer 80 has a pair of secondary windings 82, each being connected to a different one of the rectifier firing electrodes 138, 139. The remaining base electrode 72 is connected through a resistor 84 and a resistor 140 to one of the outputs of a rectifier bridge comprising the rectifiers 134, 135, 136, 137. The remaining output of the bridge is connected to the junction between a timing capacitor 131 and the primary winding 78. The photocell 122 and timing capacitor 131 are connected in series and their junction connected to the emitter electrode 76 of the uni-junction transistor 70. The photocell 122 is connected between the emitter electrode 76 and the junction between the resistors 140 and 84. As herein described, the controller 30 functions as a conventional proportional controller.

Figure 2:
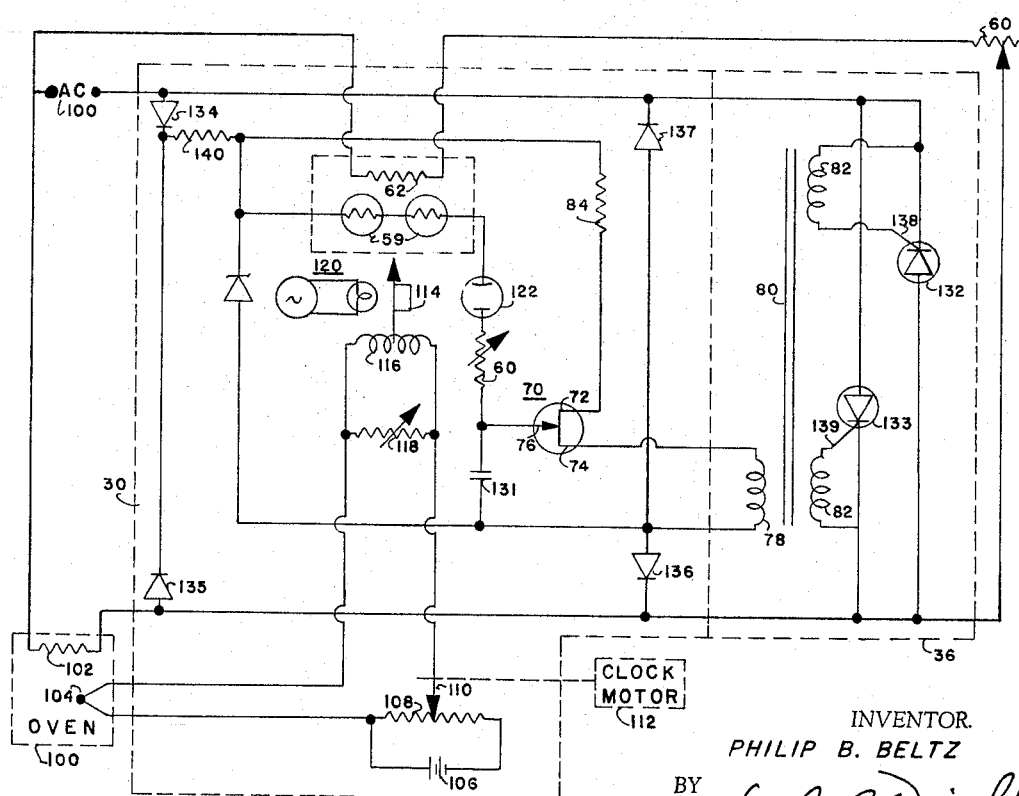
FIGURE 2 is a partial schematic and partial block diagram of a temperature controller, using silicon controlled rectifiers, constructed in accordance with this invention.

In accordance with this embodiment of the invention the reset mode of operation is added to the controller 30 of FIG. 2 by connecting the negative temperature coefficient of resistivity element 59 in series with the firing control circuit of the uni-junction transistor 70. That is to say, the thermistors 59 are connected in series with the photocell 122 and are positioned adjacent a heating element 62. The heating element 62 is connected across the oven heater 102. If the oven temperature, for example, decreases, the moving vane 114 deflects to decrease the resistance of the photocell 122. The charging time of capacitor 131 decreases thereby advancing the firing of the rectifiers 132, 133 during each half cycle of alternating current. Initially, the additional energy applied to the oven heating element 102 is small due to the high resistance of the termistors 59. However, with the continued presence of an error signal demanding more power, the reset mode of operation gradually increases the power applied both to the oven heater 102 and to the thermistor heater 62. This decreases the resistance of the thermistors, which advances the firing point of the rectifiers still more. The action is cumulative until maximum power is applied to the heater 102. Conversely, as the error signal amplitude decreases, less heat is supplied to the thermistors 59. Their differential heating-cooling rates, provided by positioning of the heating element 62, permits the rapid cooling of the thermistors. Programmed decreases in temperature are more easily accommodated thereby. The thermistor cooling, however, is not instantaneous; hence the reset function is effectively stored for the time required for the thermistors to cool. This type of a function is herein termed a differential reset mode of operation.

The initial response of the circuit to an increased load imposed upon the oven is considerably reduced using the reset mode of operation. This permits the use of high capacity oven heater to accommodate rapid programmed temperature operation as well as isothermal operation without undue cycling of oven temperature. The reset mode of operation permits the use of a relatively small proportioning band so as to facilitate relatively precise control over oven temperature. The proportioning band is adjusted by the inclusion of an adjustable resistor 60 in series with the photocell 122. In like manner the reset rate may be adjusted by the inclusion of an adjustable resistor 60 in series with the heater element 62.

There has thus been described a relatively simple, inexpensive means of adding the complex reset mode of operation to otherwise conventional proportional controllers. An added feature of the invention is that the reset mode of operation may have a differential rate, depending upon the sense of the process deviation from its desired performance characteristic.

It will be obvious that various modifications may be made in the apparatus and in the manner of operating it. It is intended to cover such modifications and changes as would occur to those skilled in the art, as far as the following claims permit and as far as consistent with the state of the prior art.

What is claimed is:
1. A temperature control system comprising:
    an oven,
    an electrical heating means for said oven,
    temperature control means for sensing when the temperature of said oven deviates from a set point,
    power means adapted to receive alternating current energy,
    a switch having a pair of current conducting electrodes and a gate electrode, said current conducting electrodes interconnecting said power means and said heating means,
    a timing capacitor,
    means for periodically charging said timing capacitor at a varying rate.
    means for varying the magnitude of said rate including a resistance element having a negative temperature coefficient of resistance and a variable impedance means responsive to said temperature control means serially connected to said timing capacitor,
    trigger circuit means connected to said timing capacitor for passing a gating signal to said gate electrode whenever the charge across said timing capacitor equals a predetermined value, and
    additional heating means responsive to the energy supplied to said electrical heating means for varying the temperature of said resistance element, thereby to vary the response characteristic of said oven to temperature changes.

2. The control system set forth in claim 1 wherein said temperature control means includes:
    means for deriving an electrical signal having an amplitude proportional to the temperature of said oven,
    programmed signal means for establishing an electrical signal having amplitude proportional to the desired temperature of said oven, and
    comparator means responsive to both said desired and actual signals for generating an electrical signal corresponding to the difference therebetween.

3. The control system set forth in claim 2 wherein said additional heating means comprises a heating element positioned proximate to said resistance element.

4. The control system set forth in claim 3 wherein said heating element is connected in parallel with said electrical heating means for said oven.

5. The combination set forth in claim 4 wherein said additional heating means is adapted to vary the temperature of said resistance element at rates which vary differentially with the direction of temperature change, thereby to provide a differential reset mode of operation.

6. The combination set forth in claim 4 wherein said resistance element is a thermistor, said additional heating element being positioned closely adjacent only one side of said thermistor thereby to differentially vary the rate of change of temperature of said element.

References Cited by the Examiner

UNITED STATES PATENTS

| | | | |
|---|---|---|---|
| 2,138,593 | 11/1938 | Brietenstein | 236—69 |
| 2,292,937 | 8/1942 | Harrison | 236—46 X |
| 2,694,169 | 11/1954 | Ehret. | |
| 2,729,396 | 1/1956 | Impey et al. | 236—68 |
| 2,954,479 | 9/1960 | Cibelius | 219—501 X |
| 3,114,025 | 12/1963 | Blauvelt et al. | 219—494 |
| 3,149,224 | 9/1964 | Horne et al. | 219—497 |

ALDEN D. STEWART, *Primary Examiner.*